United States Patent [19]

Coleman

[11] Patent Number: 4,644,408
[45] Date of Patent: Feb. 17, 1987

[54] TELEVISION RECEIVER HAVING MULTI-PURPOSE CHASSIS FRAME

[75] Inventor: Clyde F. Coleman, Crawfordsville, Ind.

[73] Assignee: RCA Corporation, Princeton, N.J.

[21] Appl. No.: 809,807

[22] Filed: Dec. 16, 1985

[51] Int. Cl.[4] .............................................. H04N 5/64
[52] U.S. Cl. .................................... 358/254; 312/7.2; 361/395; 361/399
[58] Field of Search ........................ 358/254; 312/7.2; 361/395, 399

[56] References Cited

U.S. PATENT DOCUMENTS

| | | | |
|---|---|---|---|
| 2,543,146 | 2/1951 | Bace | 178/7.5 |
| 2,690,944 | 10/1954 | Herron | 312/7 |
| 2,896,200 | 7/1959 | Aeschliman | 340/367 |
| 3,489,852 | 1/1970 | Vistain, Jr. et al. | 358/254 |
| 3,573,366 | 4/1971 | Joseph et al. | 178/7.8 |
| 3,637,932 | 1/1972 | Wigley | 358/254 |
| 3,703,323 | 11/1972 | Gallas et al. | 312/7 |
| 3,768,064 | 10/1973 | Pabich | 339/36 |
| 4,388,671 | 6/1983 | Hall et al. | 361/399 X |
| 4,398,236 | 8/1983 | Campisi et al. | 361/399 X |
| 4,411,480 | 10/1983 | Gibson | 312/7.2 |
| 4,471,898 | 9/1984 | Parker | 361/399 X |

Primary Examiner—James J. Groody
Assistant Examiner—John C. Fox
Attorney, Agent, or Firm—Paul J. Rasmussen; Eric P. Herrmann; Dilip A. Kulkarni

[57] ABSTRACT

The television cabinet comprises of a cabinet front, a back cover and a chassis frame. When the back cover is secured to the cabinet front with the chassis frame interposed therebetween, the members define an enclosure for housing the picture tube and the electronics. The exterior surfaces of the cabinet front, back cover and the chassis frame form the exterior walls of the cabinet upon assembly of the members, with the chassis frame spaced inwardly from the leg portions of the cabinet front and the back cover supporting the cabinet.

16 Claims, 8 Drawing Figures

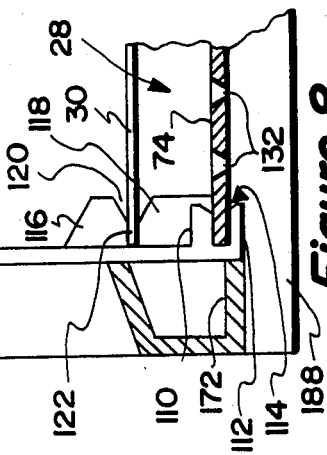
Figure 8 (Section D-D)
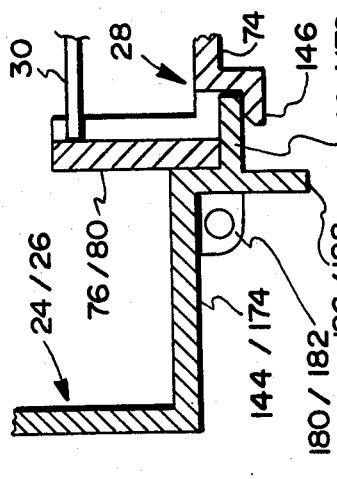
Figure 6 (Section B-B & E-E)
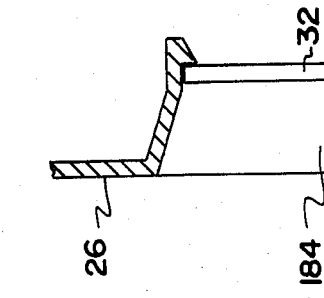
Figure 4
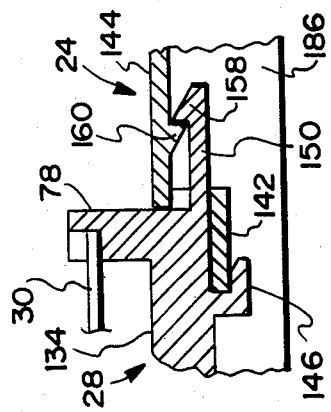
Figure 5 (Section A-A)
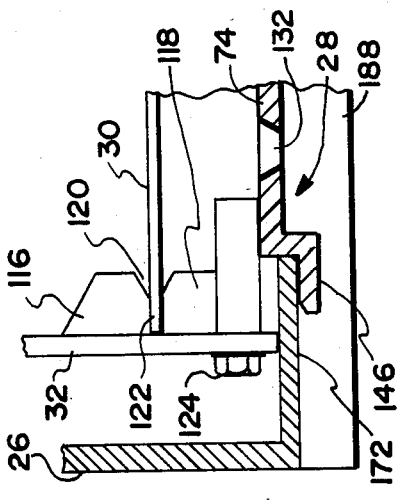
Figure 7 (Section C-C)

TELEVISION RECEIVER HAVING MULTI-PURPOSE CHASSIS FRAME

This invention relates to television receivers, and more specifically, it concerns with a cost-effective design of television cabinets.

Typically, the cabinet of a portable television receiver is made up of a pair of injection molded halves—the cabinet front and the back cover, both of which are molded from a suitable thermoplastic material (e.g., high-impact polystyrene). The picture tube and the chassis or the printed circuit board carrying the electronics are mounted to the cabinet front. The cabinet front has an opening through which the faceplate of the picture tube is exposed for viewing. Integrally molded with the cabinet front is a bottom shelf that extends the full depth of the television receiver, and on which the printed circuit board is mounted. The back cover is then attached to the cabinet front to enclose the picture tube and the electronics.

SUMMARY OF INVENTION

In accordance with this invention, the television cabinet consists of a cabinet front, a chassis frame and a back cover—the exterior surfaces of which respectively define the outer walls of the cabinet. The picture tube is secured to the cabinet front. The printed circuit board carrying the electronics is mounted on the chassis frame. The cabinet front is secured to the back cover with the chassis frame interposed therebetween to form an enclosure for housing the picture tube and the printed circuit board. The chassis frame is inwardly spaced from the leg portions of the cabinet front and back cover supporting the television receiver.

Pursuant to a further feature of the invention, the television receiver includes a jack panel with a set of input/output jacks. The jack panel is mounted to the chassis frame such that the input/output jacks are exposed through a window in the back cover when it is assembled to the cabinet front.

According to a still further aspect of the invention, the signal processing circuitry includes a plurality of semiconductor chip components disposed on one side of the printed circuit board. The printed circuit board is mounted on the chassis frame such that the side of the printed circuit board carrying the chip components faces the chassis frame, whereby the chip components are protected during handling and shipping.

An advantage of the cabinet construction in accordance with the present invention is that the chassis frame not only supports and protects the printed circuit board and the electronic components mounted thereon during handling and shipping, but it also serves as the bottom wall of the television cabinet. This, in turn, eliminates the need for a cabinet front with an integrally-molded shelf for supporting the electronics, thereby considerably simplifying the tooling required for molding the plastic cabinet front.

Another advantage of this invention is that it facilitates the assembly of the electronic chassis to take place at a location that is geographically separated from the location where the final instrument assembly is carried out. As the television industry becomes more competitive, it is becoming increasingly important to move the labor-intensive operations—such as the chassis assembly—to locations where the labor is relatively inexpensive. It is, therefore, particularly advantageous to have a chassis frame that can protect the electronics during transportation to the location where the final instrument assembly takes place.

A further advantage of the present design is that it allows the chassis frame to be made from a relatively inexpensive material as contrasted with the material used for the cabinet front and the back cover. The cost reduction is possible without compromising the asthetic qualities of the television receiver because the chassis frame is normally concealed from view.

IN THE DRAWINGS

FIG. 4 is the bottom view of the FIG. 3 printed circuit board showing semiconductor chip components; and FIGS. 5-8 are cross-sectional views of the television receiver along the section lines AA through EE in FIGS. 1 and 2 respectively.

DETAILED DESCRIPTION

Figure 1:
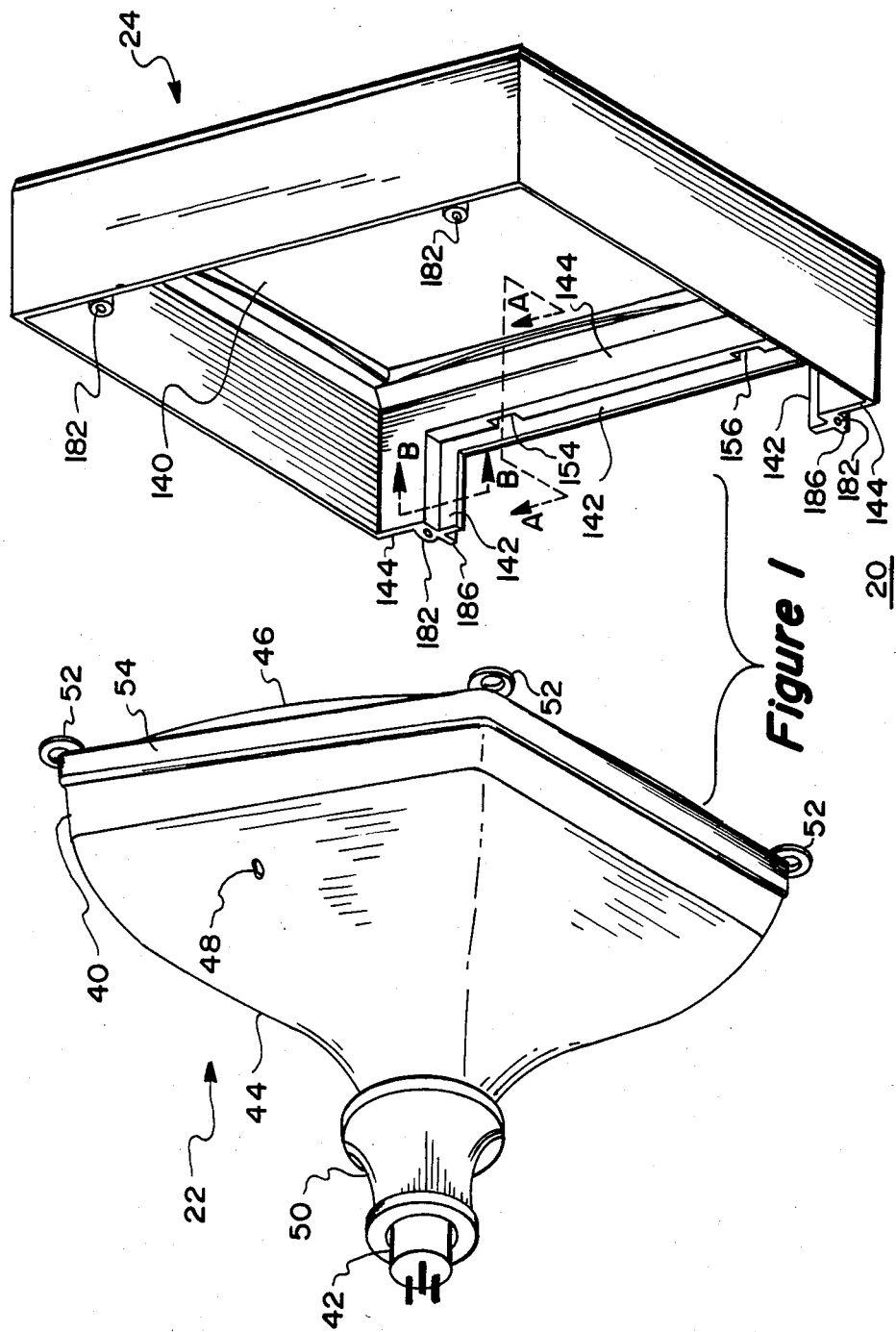
FIGS. 1 and 2 represent exploded perspective views of a television receiver built in accordance with the principles of the present invention.
Figure 2:
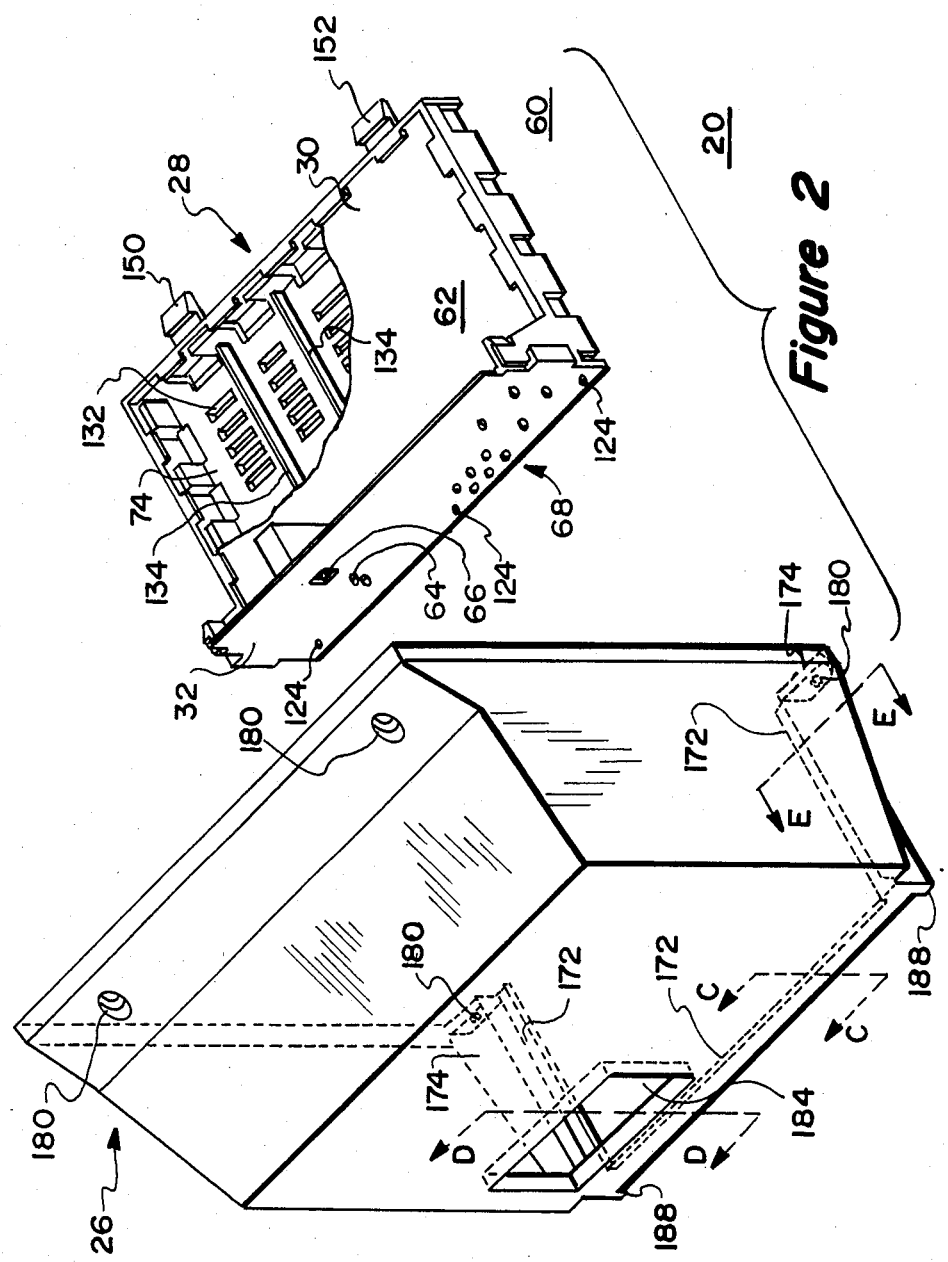

As shown in FIGS. 1 and 2, a television receiver 20, in accordance with this invention, consists of a picture tube 22, a cabinet front 24, a back cover 26, a chassis frame 28, a printed circuit board 30 and an input/output jack panel 32.

The picture tube 22 comprises a rectangular box-like portion 40 connected to a narrow neck portion 42 by means of an intermediate funnel portion 44. The rectangular portion 40 includes a screen 46 having its interior surface coated with red, green and blue phosphor stripes. Disposed inside the neck portion 42 are red, green and blue electron guns.

The inside of the funnel portion 44 is covered with a conductive coating to which a high voltage is applied through an anode contact button 48. Disposed about the neck portion 42 is a yoke assembly 50. The yoke assembly 50 includes horizontal and vertical deflection coils.

To mount the picture tube 22 to the cabinet front 24, each of the corners of the picutre tube 22 are provided with a mounting bracket 52. The mounting brackets 52 are attached to the picture tube 22 by means of a strap 54 wrapped around the front rim of the picture tube. The mounting brackets 52 are, in turn, secured to the cabinet front 24 by means of a set of screws.

Figure 3:
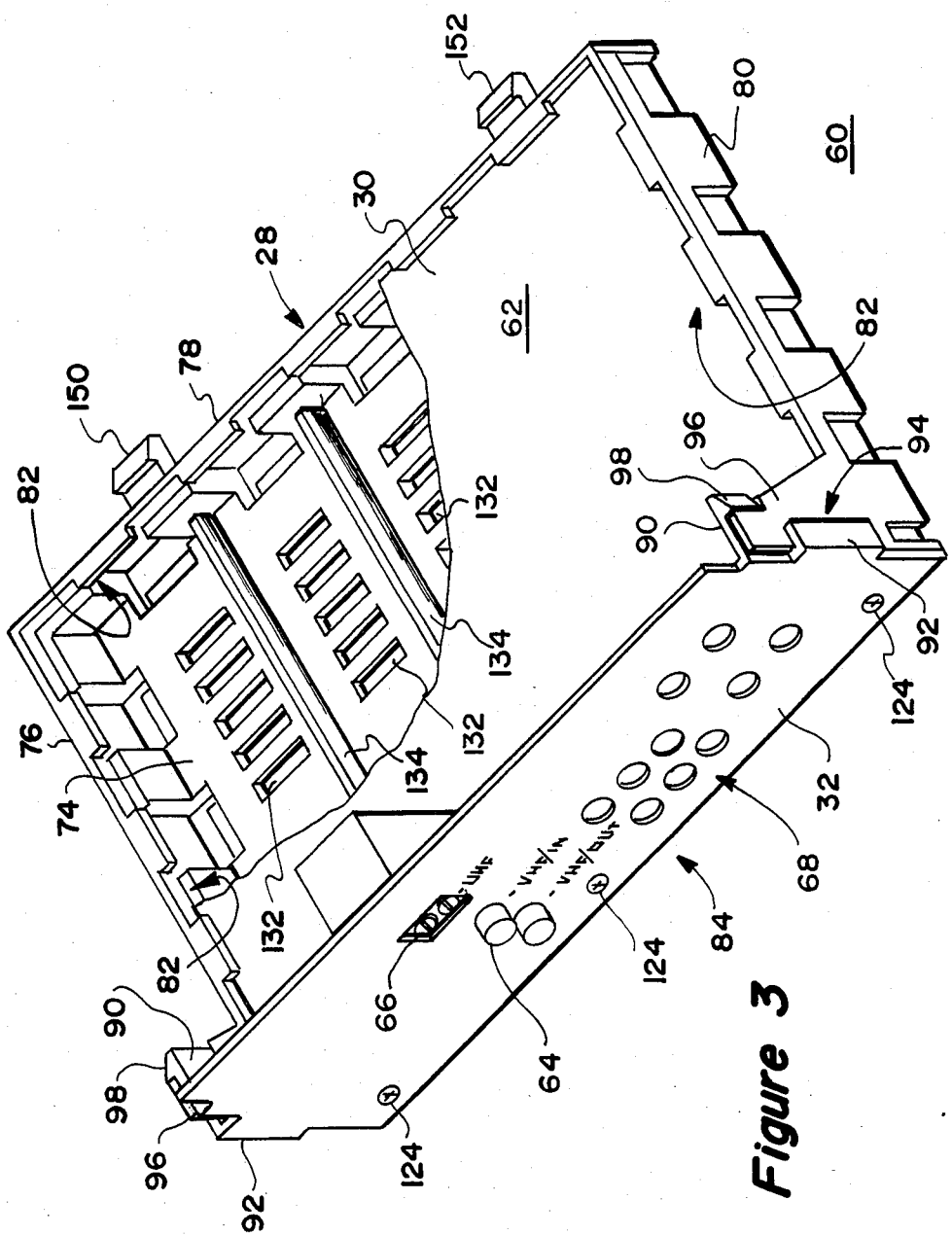
FIG. 3 is a perspective view of the chassis frame assembly suitable for use in the television receiver of FIGS. 1 and 2, and consisting of a chassis frame, a printed circuit board and an input/output jack panel.

In the manner shown in FIG. 3, the chassis assembly 60 consists of the printed circuit board 30 held in place between the chassis frame 28 and the jack panel 32. As previously mentioned, the chassis frame 28 not only supports the electronic components during handling and shipping, but it also forms the bottom wall of the television cabinet.

The printed circuit board 30 supports and interconnects substantially all of the electronic components that define the electronic circuits 62 for processing the input signals applied to the VHF and UHF antenna terminals 64 and 66. The electronic circuits 62 of the television receiver 20 process the input signals to generate the respective video and audio output signals for application to the electron guns and the audio speakers. In addition, the signal processing circuits 62 produce various voltages required for proper operation of the television receiver 20—e.g., voltages required for focussing electrodes, degaussing coil, deflection coils, etc.

The printed circuit board 30 is further provided with a plurality of ports 68 for making various alignment and setup adjustments to the electrical parameters of the signal processing and deflection circuits 62. The alignment and setup adjustments are made for the purposes of achieving correct drive, bias, height, width, pincushion correction, centering, etc.

The chassis frame 28 comprises a bottom wall 74 which is surrounded along the three sides thereof by perpendicularly-disposed side walls 76, 78 and 80. The side walls 76, 78 and 80 have a number of peripheral, C-shaped channels 82 for capturing the outer edges of the printed circuit board 30. The fourth or back side 84 of the chassis frame 28 is left open so that the printed circuit board 30 can be inserted into the C-shaped channels 82 through the open side. The location of the peripheral channels 82 is such that the printed circuit board 30 is spaced from the bottom wall 74 of the chassis frame 28 as can be seen from FIGS. 5 to 8.

The jack panel 32 has a plurality of openings for providing access to the antenna terminals 64 and 66 and the alignment and set-up ports 68 mounted on the printed circuit board 30. At each end, the jack panel 32 is equipped with a pair of offset extensions 90 and 92, which define a groove 94. Disposed on the chassis frame 28, at each end thereof, are a pair of wedge-shaped vertical tabs 96. As the jack panel 32 is assembled to the chassis frame 28, the vertical tabs 96 on the chassis frame are received in the respective grooves 94 in the jack panel. Each of the horizontal extensions 90 disposed on the jack panel 32 is provided with a step portion 98. The step portions 98 capture the vertical tabs 96 of the chassis frame 28 upon assembly.

The jack panel 32 is provided with a pair of flanges 110 and 112 as depicted in FIG. 8. The flanges 110 and 112 define a slot 114 for capturing the bottom wall 74 of the chassis frame 28. The jack panel 32 also includes a pair of projecting rib portions 116 and 118 as illustrated in FIGS. 7 and 8. The rib portions 116 and 118 define a C-shaped channel 120 into which the back edge 122 of the printed circuit board 30 is received. The jack panel 32 is secured to the chassis frame 28 with a set of screws 124 to hold the printed circuit board 30 in place.

When the jack panel 32 is attached to the chassis frame 28, the various terminals and ports 64, 66 and 68 on the printed circuit board 30 are registered with the respective openings in the jack panel. The jack panel 32 serves to rigidly support the back edge 122 of the printed circuit board 30 in the vertical direction.

The signal processing circuits 62 disposed on the printed circuit board 30 include a number of semiconductor chip components 130 (e.g., resistors, capacitors, transistors, diodes, etc.) disposed on the bottom side thereof as shown in FIG. 4. The printed circuit board 30 is secured to the chassis frame 28 such that the chip components 130 are interposed between the bottom side of the printed circuit board and the chassis frame, whereby the chip components are protected during handling and shipping.

The bottom wall 74 of the chassis frame 28 is provided with a number of louvers 132 to allow circulation of air. Air circulation dissipates the heat generated by the signal processing circuits 62 during the operation of the television receiver 20. The louvers 132 are dimensioned such that entry of human fingers into the cabinet enclosure is restricted, thereby reducing safety hazard.

A plurality of reinforcing ribs 134 are inwardly disposed on the bottom wall 74 of the chassis frame to assure structural integrity thereof.

The cabinet front 24 is provided with an opening 140 for framing the faceplate 46 of the picture tube 22 when the picture tube is secured to the cabinet front. The cabinet front 24 is further equipped with the ledge portions or rails 142, as shown in FIGS. 1, 5 and 6, along the bottom edge portion 144 thereof. Disposed on the underside of the chassis frame 28 are a plurality of flange portions 146 in the manner indicated in FIGS. 5, 6 and 7. When the chassis frame 28 is inserted into the cabinet front 24, the ledge portions 142 of the cabinet front are guided along a path into the C-shaped channels or tracks defined by the flange portions 146 of the chassis frame.

The chassis frame 28 is further equipped with a pair of latch fingers 150 and 152. As the chassis frame 28 is inserted into the cabinet front 24, the latch fingers 150 and 152 enter the respective apertures 154 and 156 disposed along the bottom edge portion 144 of the cabinet front. Each of the latch fingers 150 and 152 is provided with a step portion 158 as indicated in FIG. 5. The step portions 158 engage corresponding ramp portions 160 disposed on the underside of the bottom edge portion 144 of the cabinet front 24. The engagement releasably secures the chassis frame 28 to the cabinet front 24.

The back cover 26 is similarly equipped with the peripheral ledge portions or rails 172, as can be seen from FIGS. 2 and 6-8, along the bottom edge portion 174 thereof. As the back cover 26 is assembled to the cabinet front 24, the ledge portions 172 are received in the C-shaped channels or tracks defined by the flange portions 146 provided on the underside of the chassis frame 28 to guide the back cover along a direction parallel to the afore-mentioned path.

The back cover 26 is secured to the cabinet front 24 by means of screws. The back cover 26 is provided with a plurality of recessed holes 180 through which the screws are inserted. The cabinet front 24 is equipped with a corresponding plurality of cylindrical bosses 182 into which the screws are threaded to securely attach the back cover 26 to the cabinet front 24 with the chassis frame 28 interposed therebetween. The back cover 26 is provided with a window 184 through which the antenna terminals 64 and 66 are made accessible.

The ledge portions 142 and 172 disposed on the cabinet front 24 and back cover 26 are located such that the chassis frame 26 is spaced inwardly from the leg portions 186 and 188 of the cabinet front and back cover supporting the television receiver 20 in the manner depicted in FIGS. 5–8.

The cabinet front 24, back cover 26 and chassis frame 28 are made from suitable thermoplastic materials. Illustratively, the cabinet front 24 and the rear cover 26 are made from high-impact polystyrene, and the chassis frame 28 is made from phenylene oxide (e.g., Noryl ® made by G.E.)

As previously mentioned, this invention goes to a cost-effective cabinet design. The chassis frame not only supports and protects the electronics during handling and shipping, but it forms the bottom wall of the television cabinet. Another advantage of this construction is that it facilitates assembly of the electronic chassis at a location where the labor is relatively inexpensive. A still further advantage of the present design is that it permits the construction of the chassis frame from a different material than the material used for the cabinet front and the back cover.

What is claimed is:

1. A display device comprising:
   a print circuit board for supporting and interconnecting a plurality of electronic components; said interconnected electronic components forming a circuit for processing an image-representatie input signal for generating an output signal;
   a bottom member for supporting said printed circuit board; said bottom member being provided with a pair of tracks;
   a picture tube having a faceplate for displaying successive images in response to the application of said output signal thereto;
   a front member for supporting said picture tube; said front member having an opening through which said faceplate is exposed; said front member being equipped with a pair of rails which engage said tracks in said bottom member for quiding said bottom member along a path as it is assembled to said front member;
   a back member having disposed thereon a pair of rails which engage said tracks in said bottom member for guiding said back member parallel to said path when it is assembled to said bottom member; and
   means for securing said back member to said front member with said bottom member interposed therebetween to define an enclosure for housing said picture tube and said printed circuit board upon assembly of said members to each other; wherein the outer surfaces of said front, back and bottom members define the respective outer walls of said enclosure upon said assembly; wherein the location of said rails in said front and back members is such that said bottom member is spaced inwardly from the leg portions of said front and back members supporting said display device.

2. The display device as defined in claim 1 wherein said bottom member is provided with a plurality of side wall portions for locating said printed circuit board in a spaced relationship with respect to said bottom member.

3. The display device as defined in claim 2 wherein said side wall portions in said bottom member are equipped with a corresponding number of C-shaped channels in which the outer edges of said printed circuit board are captured to hold it in place.

4. The display device as defined in claim 2 wherein said signal processing circuit includes a number of semiconductor chip components disposed on one side of said printed circuit board; wherein said printed circuit board is mounted on said bottom member such that said chip components are interposed between said printed circuit board and said bottom member, thereby protecting said chip components during handling and shipping.

5. The display device as defined in claim 1 wherein said bottom member is provided with a multiplicity of openings to allow circulation of air through said enclosure.

6. The display device as defined in claim 5 wherein said openings in said bottom member are dimensioned such that entry of human fingers into said enclosure is precluded.

7. The display device as defined in claim 1 further including a jack panel secured to said bottom member; said jack panel having a multiplicity of openings for a corresponding number of input/output terminals disposed on said printed circuit board; said back member having an opening through which said input/output terminals on said printed circuit board are exposed upon assembly of said back member to said front member with said bottom member sandwiched therebetween.

8. The display device as defined in claim 7 wherein said printed circuit board is held in place in the horizontal plane between the side wall portions of said bottom member and said jack panel.

9. The display device as defined in claim 7 wherein said jack panel is secured to said bottom member by a set of screws.

10. The display device as defined in claim 7 wherein said jack panel is provided with a pair of flange portions which define a slot into which the back edge of said bottom member is received.

11. The display device as defined in claim 7 wherein said jack panel is equipped with a pair of projecting rib portions which define a groove into which the back edge of said printed circuit board is captured.

12. The display device as defined in claim 1 wherein said tracks in said bottom member are in the form of C-shaped channels for slidably receiving said rails provided in said front and back members in order to hold said bottom member in place.

13. The display device as defined in claim 1 wherein one of said front and bottom members is provided with at least one snap-on latch finger; wherein the other of said front and bottom members is equipped with a corresponding number of stops which capture the respective ones of said latch fingers when said bottom member is fully seated into said front member to lock said bottom member in place.

14. The display device cabinet as defined in claim 1 wherein said means for securing said back member to said front member comprises a set of screws.

15. The display device as defined in claim 1 wherein said front, back and bottom members are injection molded from a suitable thermoplastic material.

16. A display device cabinet for use with a picture tube and a printed circuit board comprising:
    a bottom member for supporting said printed circuit board; said bottom member being provided with a pair of tracks;
    a front member for supporting said picture tube; said front member having an opening for framing the faceplate of said picutre tube; said front member being equipped with a pair of rails which engage said tracks in said bottom member for guiding said bottom member along a path as it is assembled to said front member; and
    a back member having disposed thereon a pair of rails which engage said tracks in said bottom member for guiding said back member parallel to said path when it is assembled to said bottom member; and
    means for securing said back member to said front member with said bottom member interposed therebetween for defining said cabinet in order to house said picture tube and said printed circuit board upon assembly of said members to each other; wherein the outer surfaces of said front, back and bottom members define the respective outer walls of said cabinet upon said assembly; wherein the location of said rails in said front and back members is such that said bottom member is spaced inwardly from the leg portions of said front and back members supporting said cabinet.

* * * * *